US010671717B2

(12) United States Patent
Takemori et al.

(10) Patent No.: US 10,671,717 B2
(45) Date of Patent: Jun. 2, 2020

(54) COMMUNICATION DEVICE, COMMUNICATION METHOD AND COMPUTER PROGRAM

(71) Applicant: KDDI CORPORATION, Tokyo (JP)

(72) Inventors: Keisuke Takemori, Tokyo (JP); Takamasa Isohara, Tokyo (JP); Yoshiyuki Shibata, Tokyo (JP); Kei Katou, Tokyo (JP); Teruaki Honma, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 80 days.

(21) Appl. No.: 15/769,231

(22) PCT Filed: Oct. 19, 2016

(86) PCT No.: PCT/JP2016/080959
§ 371 (c)(1),
(2) Date: Apr. 18, 2018

(87) PCT Pub. No.: WO2017/069155
PCT Pub. Date: Apr. 27, 2017

(65) Prior Publication Data
US 2018/0314813 A1      Nov. 1, 2018

(30) Foreign Application Priority Data

Oct. 23, 2015   (JP) .................................. 2015-209283

(51) Int. Cl.
*H04L 29/06*         (2006.01)
*G06F 21/33*         (2013.01)
(Continued)

(52) U.S. Cl.
CPC ................ *G06F 21/33* (2013.01); *H04L 9/08* (2013.01); *H04L 9/0894* (2013.01); *H04L 9/30* (2013.01); *H04L 9/32* (2013.01)

(58) Field of Classification Search
CPC ......... G06F 21/33; H04L 9/30; H04L 9/0894; H04L 9/32; H04L 9/08
See application file for complete search history.

(56) References Cited

U.S. PATENT DOCUMENTS 9,098,714 B2      8/2015   Sharp et al.
2002/0099663 A1*  7/2002   Yoshino .................. G06F 21/10
                                                                      705/65

(Continued)

FOREIGN PATENT DOCUMENTS

EP        2 763 345 A      8/2014
JP        2004-248220 A    9/2004

(Continued)

OTHER PUBLICATIONS

Berket et al., "PKI-based security for peer-to-peer information sharing", Proceedings. Fourth International Conference on Peer-to-Peer Computing,Date of Conference: Aug. 27-27, 2004.*

(Continued)

*Primary Examiner* — Morshed Mehedi
(74) *Attorney, Agent, or Firm* — Greenblum & Bernstein, P.L.C.

(57) ABSTRACT

A communication device includes: a first subscriber identification unit that stores first subscriber identification unit identification information associated with user identification information; and a communication unit that communicates with another communication device, the other communication device including a second subscriber identification unit that stores second subscriber identification unit identification information associated with user identification information. The first subscriber identification unit includes: a key memory unit that records a pair of a public key certificate and a secret key, the pair being shared with the second subscriber identification unit; a public key certificate generation unit that generates, using the secret key recorded in (Continued)

the key memory unit, a "first public key certificate comprising the first subscriber identification unit identification information or the user identification information associated with the first subscriber identification unit identification information"; and a secret key memory unit that records a secret key paired with the first public key certificate.

9 Claims, 6 Drawing Sheets

(51) Int. Cl.
*H04L 9/32* (2006.01)
*H04L 9/08* (2006.01)
*H04L 9/30* (2006.01)

(56) References Cited

U.S. PATENT DOCUMENTS

| | | | |
|---|---|---|---|
| 2004/0117623 A1* | 6/2004 | Kalogridis | H04L 63/0807 713/165 |
| 2004/0158716 A1* | 8/2004 | Turtiainen | H04L 63/06 713/172 |
| 2004/0196981 A1* | 10/2004 | Nakano | G06F 21/10 380/280 |
| 2006/0177111 A1 | 8/2006 | Yano et al. | |
| 2008/0285755 A1 | 11/2008 | Camus et al. | |
| 2009/0204809 A1* | 8/2009 | Nasu | H04L 9/3263 713/156 |
| 2009/0209232 A1* | 8/2009 | Cha | H04L 63/0428 455/411 |
| 2009/0259851 A1 | 10/2009 | Faynberg et al. | |
| 2011/0047373 A1* | 2/2011 | Karasawa | H04L 9/3247 713/156 |
| 2013/0073845 A1* | 3/2013 | Teranishi | H04L 9/3255 713/156 |
| 2014/0143826 A1* | 5/2014 | Sharp | G06F 21/604 726/1 |
| 2014/0189808 A1* | 7/2014 | Mahaffey | H04L 63/083 726/4 |
| 2014/0208117 A1 | 7/2014 | Hayashi et al. | |
| 2014/0359288 A1 | 12/2014 | Jensen et al. | |
| 2015/0304113 A1 | 10/2015 | Nix | |
| 2016/0344559 A1* | 11/2016 | Ma | H04L 9/3263 |

FOREIGN PATENT DOCUMENTS

| | | |
|---|---|---|
| JP | 2005-122567 A | 5/2005 |
| JP | 2006-197127 A | 7/2006 |
| JP | 2008-538668 A | 10/2008 |
| JP | 2013-78042 A | 4/2013 |

OTHER PUBLICATIONS

Huang et al., "Multi-Authority Attribute Based Encryption Scheme with Revocation", 2015 24th International Conference on Computer Communication and Networks (ICCCN), Date of Conference: Aug. 3-6, 2015.*

May 14, 2019 Extended European Report in corresponding European Application No. 16857468.9.

ITpro "Introduction to Information Security—PKI (Second Part)—X.509 Certificate and Structure of PKI", Internet<URL:http://itpro.nikkeibp.co.jp/article/COLUMN/20060725/244233/>, with partial English language translation, pp. 1-4, and one page English translation, Apr. 4, 2018.

Keisuke Takemori et al., "Key Managements for ECU and Code Authentications Using Tamper-resistant Secure Element", IEICE Technical Report, vol. 115, No. 366, (including English Abstract in the front page), Dec. 10, 2015, pp. 227-232.

International Search Report in International Patent Application No. PCT/JP2016/080959, dated Dec. 6, 2016, 2 pages, along with an English translation thereof, 2 pages.

Dec. 3, 2019 Notice of Reasons for Rejection in corresponding Japanese Application No. 2018-226809 and English translation thereof.

* cited by examiner

COMMUNICATION DEVICE, COMMUNICATION METHOD AND COMPUTER PROGRAM

TECHNICAL FIELD

The present invention relates to a communication device, a communication method and a computer program.

The present application claims priority on Japanese Patent Application No. 2015-209283, filed Oct. 23, 2015, the content of which is incorporated herein by reference.

BACKGROUND ART

Conventionally, public key cryptography has beets known as a technique for ensuring the privacy of communicated data. Public key cryptography generally involves exchanging public keys (public key certificates) by making use of PKI (Public Key Infrastructure) (see, e.g., Non-Patent Document 1).

PRIOR ART DOCUMENTS

Non-Patent Documents

[Non-Patent Document 1]
ITpro, "Introduction to information security—PKI (latter part)—How X.509 certificates and PKI work", internet <URL: http://itpro.nikkeibp.co.jp/article/COLUMN/20060725/244233/>

SUMMARY OF THE INVENTION

Problem to be Solved by the Invention

However, the exchange of public keys (public key certificates) using conventional PKI required the supplier of the public key (public key certificate) to send a public key to a certification authority (CA), which is a third-party organization, in order to be issued a public key certificate.

The present invention has been made in view of the aforementioned circumstances, and has the purpose of providing a communication device, a communication method and a computer program wherein the validity of a communication partner can be verified between communication devices at the time of distribution of a public key by means of subscriber identification information that is associated with user identification information.

Means for Solving the Problem (1): A communication device according to one aspect of the present invention includes: a first subscriber identification unit that stores first subscriber identification unit identification information associated with user identification information; and a communication unit that communicates with another communication device, the other communication device including a second subscriber identification unit that stores second subscriber identification unit identification information associated with user identification information. The first subscriber identification unit includes: a key memory unit that records a pair of a public key certificate and a secret key, the pail being shared with the second subscriber identification u a public key certificate generation unit that generates, using the secret key recorded in the key memory unit, a "first public key certificate including the first subscriber identification unit identification information or the user identification information associated with the first subscriber identification unit identification information"; and a secret key memory unit that records a secret key paired with the first public key certificate generated by the public key certificate generation unit. The communication unit transmits, to the other communication device, the first public key certificate generated by the public key certificate generation unit.

(2): in the communication device according to (1) above, the first subscriber identification unit may further comprise a first encryption processing unit that performs encryption, by public key cryptography, of information using the secret key recorded in the secret key memory unit, the information including the first subscriber identification unit identification information or the user identification information associated with the first subscriber identification unit identification information.

(3): A communication device according to one aspect of the present e includes: a first subscriber identification unit that stores first subscriber identification unit identification information associated with user identification information; a communication unit that communicates with another communication device, the other communication device including a second subscriber identification unit that stores second subscriber identification unit identification information associated with user identification information; and a public key certificate management unit that saves a public key certificate that the communication unit has received from the other communication device. The first subscriber identification unit includes: a key memory unit that records a pair of a public key certificate and a secret key, the pair being shared with the second subscriber identification unit; a public key certificate generation unit that generates, using the secret key recorded in the key memory unit, a "first public key certificate including the first subscriber identification unit identification information or the user identification information associated with the first subscriber identification unit identification information"; a secret key memory unit that records a secret key paired with the first public key certificate generated by the public key certificate generation unit; and a verification unit that verifies, using the public key certificate recorded in the key memory unit, a "second public key certificate including the second subscriber identification unit identification information or the user identification unit identification information associated with the second subscriber identification unit identification information" that the communication unit has received from the other communication device. The communication unit transmits, to the other communication device, the first public key certificate generated by the public key certificate generation unit. The public key certificate management unit stores the second public key certificate whose validity has been verified by the verification unit, in association with the second subscriber identification unit identification information or the user identification information included in the second public key certificate.

(4): In the communication device according to (3) above, the first subscriber identification unit may further include a first encryption processing unit that performs encryption, by public key cryptography, of information using the secret key recorded in the secret key memory unit, the information including the first subscriber identification unit identification information or the user identification information associated with the first subscriber identification unit identification information. The communication device may further include a second encryption processing unit that performs, using a public key included in the second public key certificate whose validity has been verified by the verification unit, encryption, by public key cryptography, of information including the second subscriber identification unit identification information or the user identification information associated with the second subscriber identification unit identification information.

(5): A communication device according to one aspect of the present invention may include: a first subscriber identification unit that stores first subscriber identification unit identification information associated with user identification information; a communication unit that communicates with another communication device, the other communication device including a second subscriber identification unit that stores second subscriber identification unit identification information associated with user identification information; and a public key certificate management unit that saves a public key certificate that the communication unit has received from the other communication device. The first subscriber identification unit may include: a key memory unit that records a pair of a public key certificate and a secret key, the pair being shared with the second subscriber identification unit; and a verification unit that verifies, using the public key certificate recorded in the key memory unit, a "second public key certificate including the second subscriber identification unit identification information or the user identification information associated with the second subscriber identification unit identification information" that the communication unit has received from the other communication device. The public key certificate management unit may store the second public key certificate whose validity has been verified by the verification unit, in association with the second subscriber identification unit identification information or the user identification information included in the second public key certificate.

(6): In the communication device according to (5) above, the communication device may further include: a second encryption processing unit that performs, using a public key included in the second public key certificate whose validity has been verified by the verification unit, encryption, by public key cryptography, of information including the second subscriber identification unit identification information or the user identification information associated with the second subscriber identification unit identification information.

(7): The communication device according to any one of (1) to (6) above, may further include: a wireless communication unit that performs communication via a wireless communication network that is connected using the first subscriber identification unit; and a key update unit that receives, via the wireless communication network, a new pair of a public key certificate and a secret key, the new pair being shared with the second subscriber identification unit.

(8): A communication method according to one aspect of the present invention is a communication method for a communication device, the communication device including: a first subscriber identification unit that stores first subscriber identification unit identification information associated with user identification information; a communication unit that communicates with another communication device, the other communication device including a second subscriber identification unit that stores second subscriber identification unit identification information associated with user identification information; and a public key certificate management unit that saves a public key certificate that the communication unit has received from the other communication device, and includes: a key recording step of recording, by the first subscriber identification unit, a pair of a public key certificate and a secret key, the pair being shared with the second subscriber identification unit; a public key certificate generating step of generating, by the first subscriber identification unit, using the secret key recorded in the key recording step, a "first public key certificate including the first subscriber identification unit identification information or the user identification information associated with the first subscriber identification unit identification information"; a secret key recording step of recording, by the first subscriber identification unit, a secret key paired with the first public key certificate generated in the public key certificate generating step; a transmitting step of transmitting, by the communication unit, the first public key certificate generated in the public key certificate generating step to the other communication device; a verifying step of verifying, by the first subscriber identification unit, using the public key certificate recorded in the key recording step, a "second public key certificate including the second subscriber identification unit identification information or the user identification information associated with the second subscriber identification unit identification information" that the communication unit has received from the other communication device; and a storing step of storing, by the public key certificate management unit, the second public key certificate whose validity has been verified in the verifying step, in association with the second subscriber identification unit identification information or the user identification information included in the second public key certificate.

(9): A computer program according to one aspect of the present invention causes a computer of a communication device including a first subscriber identification unit that stores first subscriber identification unit identification information associated with user identification information, to realize: a communication function of communicating with another communication device, the other communication device including a second subscriber identification unit that stores second subscriber identification unit identification information associated with user identification information; and a public key certificate management function of saving a public key certificate that the communication function has received from the other communication device; and causes a computer of the first subscriber identification unit to realize: a key recording function of recording a pair of a public key certificate and a secret key, the pair being shared with the second subscriber identification unit; a public key certificate generation function of generating, using the secret key recorded by the key recording function, a "first public key certificate including the first subscriber identification unit identification information or the user identification information associated with the first subscriber identification unit identification information"; secret key recording function of recording a secret key paired with the first public key certificate generated by the public key certificate generation function; and a verification function of verifying, using the public key certificate recorded by the key recording function, a "second public key certificate including the second subscriber identification unit identification information or the user identification information associated with the second subscriber identification unit identification information" that the communication function has received from the other communication device, and the communication function transmits the first public key certificate generated by the public key certificate generation function to the other communication device, and the public key certificate management function stores the second public key certificate whose validity has been verified by the verification function, in association with the second subscriber identification unit identification information or the user identification information included in the second public key certificate.

Effect of the Invention

The present invention provides the advantageous effect wherein the validity of a communication partner can be verified between communication devices at the time of distribution of a public key, by means of subscriber identification information that is associated with user identification information.

EMBODIMENTS FOR CARRYING OUT THE INVENTION

Hereinbelow, embodiments of the present invention will be explained.

First Embodiment

Figure 1:
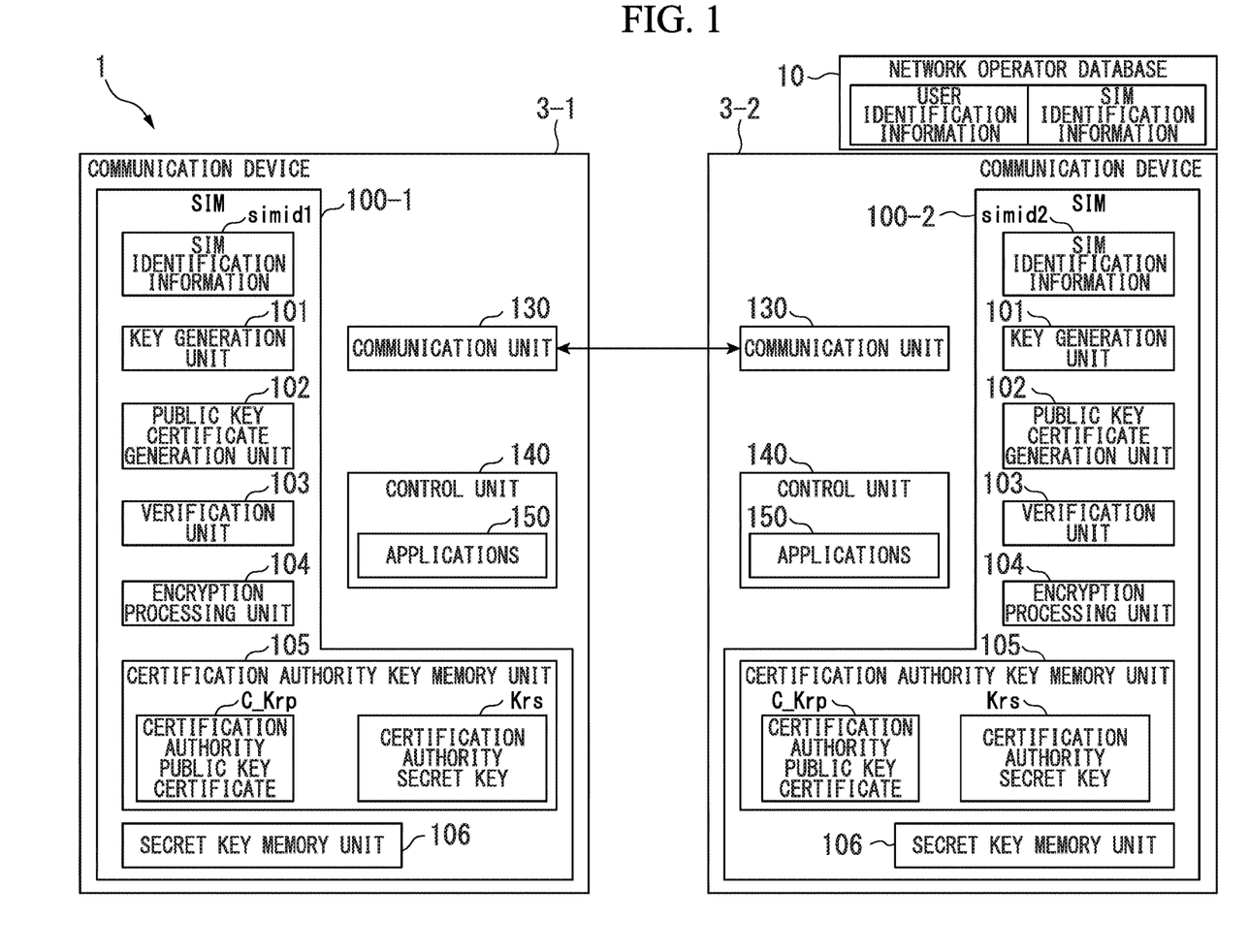
FIG. 1 is a schematic diagram showing a communication system according to a embodiment.

FIG. 1 is a schematic diagram showing a communication system 1 according to a first embodiment. In FIG. 1, the communication system 1 includes a communication device 3-1 and a communication device 3-2. The communication device 3-1 includes a SIM (Subscriber Identity Module) 100-1, a communication unit 130 and a control unit 140. The SIM 100-1 stores SIM identification information simid1. The SIM identification information simid1 is identification information that is specific to the SIM 100-1. The SIM 100-1 includes a key generation unit 101, a public key certificate generation unit 102, a verification unit 103, an encryption processing unit 104, a certification authority key memory unit 105 and a secret key memory unit 106.

The communication device 3-2 has a configuration similar to that of the communication device 3-1. In the communication device 3-2 shown in FIG. 1, the parts that correspond to pails in the communication device 3-1 are denoted by the same reference signs. In the following description, the communication device 3-1 and the communication device 3-2 will be referred to as a "communication device 3" when making no particular distinction therebetween. It is possible for a single communication device 3 to have multiple SIMs. For example, the communication device 3 may be a communication device that includes multiple SIM slots and that can switch connections between any communication network among the communication networks corresponding to SIMs that are inserted in the SIM slots.

The communication device 3-2 includes a SIM 100-2. The SIM 100-2 stores SIM identification information simid2. The SIM identification information simid2 is identification information that is specific to the SIM 100-2.

The SIM 100-1 is a SIM that has been issued to a user authenticated by a network operator.

The SIM identification information simid1 of the SIM 100-1 is stored in a network operator database 10 in association with user identification information for the user authenticated by the network operator. The SIM 100-2, like the SIM 100-1, is a SIM that has been issued to a user authenticated by the network operator. The SIM identification information simid2 of the SIM 100-2 is stored in the network operator database 10 in association with the user identification information of the user authenticated by the network operator. In the following description, the SIM 100-1 and the SIM 100-2 will be referred to as a "SIM 100" when making no particular distinction therebetween. A SIM 100 may be a SIM that is issued to a user authenticated by a virtual network operator.

The SIM identification information may, for example, be an IMSI (International Mobile Subscriber Identity) or an ICCID (Integrated Circuit Card ID). Additionally, a telephone number associated with a SIM 100 may be used as the SIM identification information of the SIM 100.

The communication unit 130 of the communication device 3-1 and the communication unit 130 of the communication device 3-2 communicate with each other.

The communications between the communication unit 130 of the communication device 3-1 and the communication unit 130 of the communication device 3-2 may be wireless communications or may be wired communications. For example, the communication unit 130 of the communication device 3-1 and the communication unit 130 of the communication device 3-2 may communicate via a wireless communication network such as a wireless LAN or a cellular telephone network. Alternatively, the communication unit 130 of the communication device 3-1 and the communication unit 130 of the communication device 3-2 may communicate by exchanging signals directly by means of near-field wireless communication technology. Alternatively, the communication unit 130 of the communication device 3-1 and the communication unit 130 of the communication device 3-2 may communicate via a communication network such as over the internet or over a fixed-line telephone network or a wired. LAN. Alternatively, the communication unit 130 of the communication device 3-1 and the communication unit 130 of the communication device 3-2 may be connected by and communicate via a communication cable.

In each communication device 3, a control unit 140 includes a CPU (Central Processing Unit) and a memory, and controls the parts forming the communication device 3. The control unit 140 includes applications 150 as functional units thereof.

A SIM 100 is a type of computer that performs desired functions by means of computer programs. In the SIM 100, a certification authority memory unit 105 records a certification authority public key certificate C_Krp and a certification authority secret key Krs, which form a pair. The certification authority public key certificate C_Krp is a public key certificate of a certification authority public key that is paired with the certification authority secret key Krs. The certification authority public key certificate C_Krp and the certification authority secret key Krs are safely stored in a SIM 100, for example, when the SIM 100 is manufactured. The certification authority public key certificate C_Krp and certification authority secret key Krs stored in the SIM 100-1 in the communication device 3-1 are identical to the certification authority public key certificate C_Krp and certification authority secret key Krs stored in the SIM 100-2 in the communication device 3-2.

The certification authority key memory unit 105 is provided in a memory area, in the SIM 100, which is a non-volatile memory area that cannot be accessed from outside the SIM 100. Thus, the certification authority public key certificate C_Krp and the certification authority secret key Krs stored in the certification authority key memory unit 105 cannot be accessed from outside the SIM 100. Additionally, the SIM 100 is tamper-proof. Thus, the certification authority public key certificate C_Krp and the certification authority secret key Krs stored in the certification authority key memory unit 105 are protected from attacks on the SIM 100.

The key generation unit 101 generates a pair of a public key and a secret key. The public key certificate generation unit 102 generates a public key certificate by using the paired certification authority public key certificate C_Krp and certification authority secret key Krs that are stored in the certification authority memory unit 105. The secret key memory unit 106 records the secret key that is paired with the public key certificate generated by the public key certificate generation unit 102. Like the certification authority key memory unit 105, the secret key memory unit 106 is stored in a memory area, in the SIM 100, which is a non-volatile memory area that cannot be accessed from outside the SIM 100. Thus, the secret key that is stored in the secret key memory unit 106 cannot be accessed from outside the SIM 100. Additionally, the SIM 100 is tamper-proof, so the secret key stored in the secret key memory unit 106 is protected from attacks on the SIM 100.

The verification unit 103 verifies a public key certificate received by the communication unit 130 from another communication device 3 by using the certification authority public key certificate C_Krp recorded in the certification authority key memory unit 105. The encryption processing unit 104 uses the secret key stored in the secret key memory unit 106 to carry out encryption by means of public key cryptography.

Figure 2:
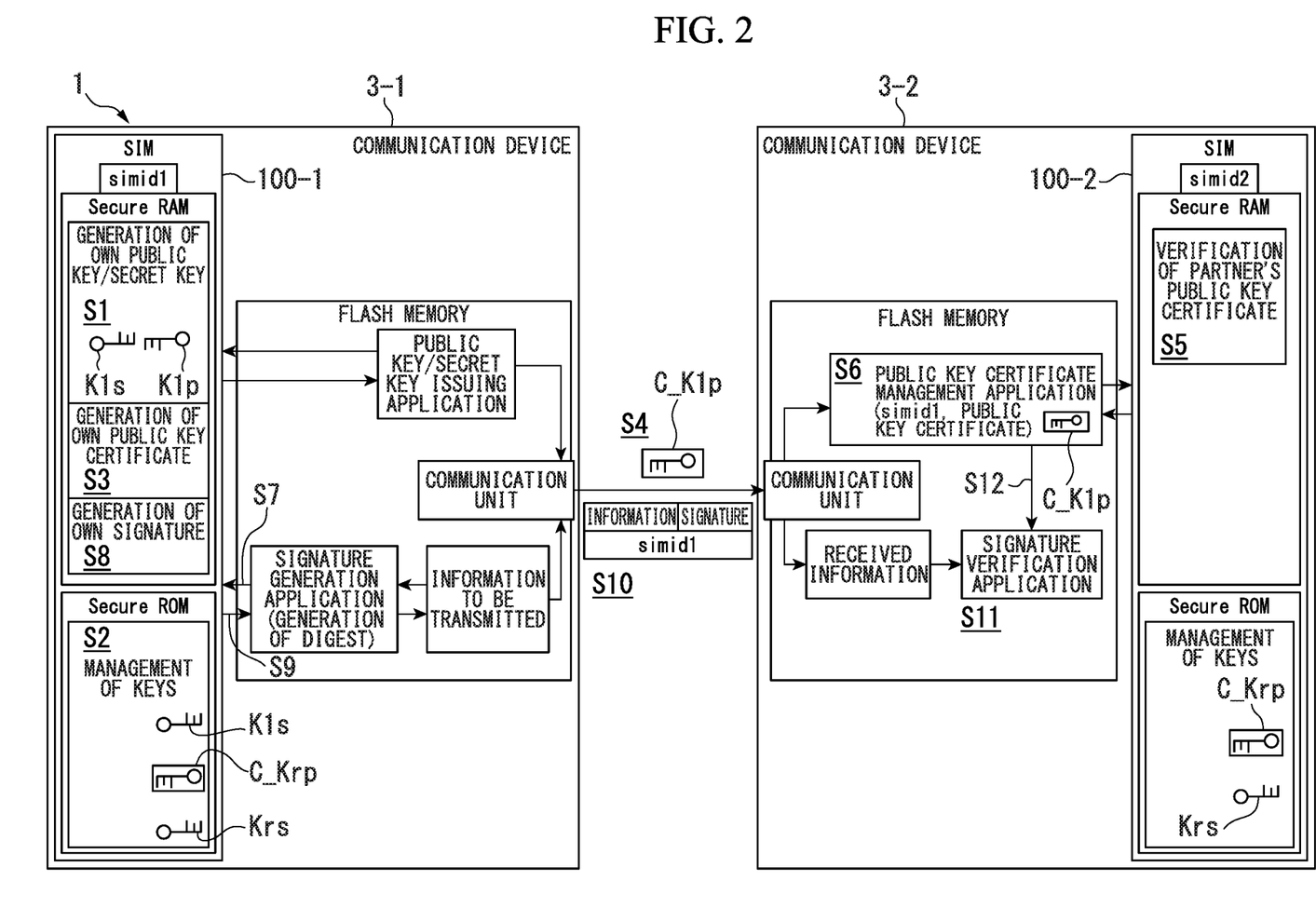
FIG. 2 is a diagram for explaining a communication method according to the first embodiment.

Next, the functions performed by the communication system 1 shown in will be explained with reference to FIG. 2. FIG. 2 is a diagram for explaining the communication method according to the present embodiment. FIG. 2 shows the case in which information is transmitted from the communication device 3-1 to the communication device 3-2. In this case, an example wherein information is transmitted from the communication device 3-1 to the communication device 3-2 will be explained, but the procedure is the same when information s transmitted in the opposite direction, from the communication device 3-2 to the communication device 3-1. The procedure is also the same when transmitting and receiving information between the communication device 3-1 and another communication device aside from the communication device 3-2. In other words, the same applies when transmitting and receiving information between multiple, i.e., three or more, communication devices.

The SIM 100-1 in the communication device 3-1 and the SIM 100-2 in the communication device 3-2 store, in the respective certification authority key memory units 105, the same certification authority public key certificate C_Krp and certification authority secret key Krs. In FIG. 2, the certification authority public key certificate C_Krp and certification authority secret key Krs are stored on secure ROMs in the SIMs 100. The secure ROMs in the SIMs 100 are non-volatile memory areas that cannot be accessed from outside the SIMs 100.

The control unit 140 in the communication device 3-1 includes, as applications 150, a public key/secret key issuing application and a signature generation application. The processing for these applications is performed in a flash memory in the control unit 140 in the communication device 3-1. The control unit 140 in the communication device 3-2 includes, as applications 150, a public key certificate management application and a signature verification application. The processing for these applications is performed in a flash memory in the control unit 140 in the communication device 3-2.

[Public Key Certificate Transmission Procedure]

First, steps S1 to S6 in the public key certificate transmission procedure will be explained.

(Step S1)

In the communication device 3-1, the public key/secret key issuing application instructs the SIM 100-1 to generate a pair of a public key and a secret key pair. In response to the instruction, a key generation unit 101 in the SIM 100-1 generates a public key K1$p$ and a secret key K1$s$. The public key K1$p$ and the secret key K1$s$ are generated in a secure RAM inside the SIM 100-1. The secure RAM in the SIM 100-1 is a volatile memory area that cannot be accessed from outside the SIM 100-1. Thus, the processing that occurs in the secure RAM in the SIM 100-1 is concealed from the outside of the SIM 100-1.

(Step S2)

In the SIM 100-1, the secret key memory unit 106 stores the secret key (own secret key) K1$s$ generated by the key generation unit 101. In FIG. 2, the secret key K1$s$ is stored in the secure ROM in the SIM 100-1.

(Step S3)

In the SIM 100-1, a public key certificate generation unit 102 generates a public key certificate C_K1$p$ for the public key K1$p$ generated by the key generation unit 101. This public key certificate C_K1$p$ is generated in the secure RAM in the SIM 100-1. The public key certificate C_K1$p$ contains the public key K1$p$, the SIM identification information simid1 and an electronic signature of the public key K1$p$. The electronic signature of the public key K1$p$ is encrypted data resulting from the encryption, with the certification authority secret key Krs, of a digest of data including the public key K1$p$ and the SIM identification information simid1. In this case, a hash value is used as an example of the digest. Additionally, as an example of the public key certificate format, a public key certificate format according to the "X.509" standard, which is defined by ITU-T (International Telecommunication Union-Telecommunication) or the like is used. The public key K1$p$ is stored in the designated location in the "X.509" standard public key certificate format. Additionally, the SIM identification information simid1 is stored at the location for "subject parameter: subject name" in the "X.509" standard public key certificate format.

The public key certificate C_K1$p$ generation method used in the SIM 100-1 will be explained in detail. In the SIM 100-1, the public key certificate generation unit 102 computes a hash value, hash(K1$p$, simid1), of the data, in the "X.509" standard public key certificate format, which contains the public key K1$p$ and the SIM identification information simid1. Next, the public key certificate generation unit 102 encrypts the hash value, hash(K1$p$, simid1), using the certification authority secret key Krs stored in the certification authority key memory unit 105 in the SIM 100-1. This encrypted data Krs (hash(K1p, simid1)) is the electronic signature of the public key K1p. Next, the public key certificate generation unit 102 forms a public key certificate C_K1p "K1p, simid1, Krs (hash(K1p, simid1))", the "X.509" standard public key certificate format, which includes the public key K1p, the SIM identification information simid1 and the electronic signature Krs (hash(K1p, simid1)) of the public key K1p.

The SIM 100-1 transfers the public key certificate C_K1p "K1p, simid1, Krs (hash(K1p, simid1))" generated by the public key certificate generation unit 102 to the public key/secret key issuing application.

(Step S4)

In the communication device 3-1, the public key/secret key issuing application outputs the public key certificate C_K1p "K1p, simid1, Krs (hash(K1p, simid1))", received from the SIM 100-1, to the communication unit 130. The communication unit 130 transmits the public key certificate C_K1p "K1p, simid1, Krs (hash(K1p, simid1))" to the communication device 3-2.

In the communication device 3-2, the communication unit 130 receives the public key certificate C_K1p "K1p, simid1, Krs (hash(K1p, simid1))" from the communication device 3-1. The communication unit 130 transfers the public key certificate C_K1p "K1p, simid1, Krs (hash(K1p, simid1))" to the public key certificate management application.

(Step S5)

In the communication device 3-2, the public key certificate management application transfers the public key certificate C_K1p "K1p, simid1, Krs (hash(K1p, simid1))" received from the communication device 3-1 to the SIM 100-2, and instructs the SIM 100-2 to verify the public key certificate C_K1p. In the SIM 100-2, the verification unit 103 uses the certification authority public key certificate C_Krp stored in the certification authority key memory unit 105 in the SIM 100-2 to verify the validity of the public key certificate C_K1p "K1p, simid1, Krs (hash(K1p, simid1))". The public key certificate C_K1p is verified in a secure RAM inside the SIM 100-2. The secure RAM in the SIM 100-2 is a volatile memory area that cannot be accessed from outside the SIM 100-2. Thus, the processing that occurs in the secure RAM in the SIM 100-2 is concealed from the outside of the SIM 100-2.

The verification method for the public key certificate C_K1p in the SIM 100-2 will be explained in detail. In the SIM 100-2, the verification unit 103 acquires the public key K1p and the SIM identification information simid1 from the public key certificate C_K1p "K1p, simid1, Krs (hash(K1p, simid1))", and generates verification data containing, in the "X.509" standard public key certificate format, the public key K1p and the SIM identification information simid1 that have been acquired. In the verification data, the public key K1p is stored in the designated location in the "X.509" standard public key certificate format. In the verification data, the SIM identification information simid1 is stored at the location for "subject parameter: subject name" in the "X.509" standard public key certificate format. Next, the verification unit 103 computes the verification hash value, hash'(K1p, simid1), which is the hash value of the verification data. Next, the verification unit 103 acquires the electronic signature Krs (hash(K1p, simid1)) from the public key certificate C_K1p "K1p, simid1, Krs (hash(K1p, simid1))", and decrypts the acquired electronic signature Krs (hash(K1p, simid1)) using the certification authority public key Krp in the certification authority public key certificate C_Krp recorded in the certification authority key memory unit 105 of the SIM 100-2. This decryption results in decrypted data "Krp·Krs (hash(K1p, simid1))". Next, the verification unit 103 determines whether the verification hash value, hash'(K1p, simid1), and the decrypted data "Krp·Krs (hash(K1p, simid1))" match. If, as a result of this determination, the values match, then the verification of the public key certificate C_K1p "K1p, simid1, Krs (hash(K1p, simid1))" succeeds, and if the values do not match, then the verification of the public key certificate C_K1p "K1p, simid1, Krs (hash(K1p, simid1))" fails.

In the communication device 3-2, the SIM 100-2 notifies the public key certificate management application of the results of the verification of the public key certificate C_K1p "K1p, simid1, Krs (hash(K1p, simid1))".

(Step S6)

In the communication device 3-2, upon being notified by the SIM 100-2 that the public key certificate C_K1p "K1p, simid1, Krs (hash(K1p, simid1))" has been successfully verified, the public key certificate management application saves the public key certificate C_K1p "K1p, Krs (hash (K1p, simid1))". The public key certificate C_K1p is saved by acquiring die SIM identification information simid1 that is stored at the location for "subject parameter: subject name" in the public key certificate C_K1p "K1p, simid1, Krs (hash(K1p, simid1))", and storing the public key certificate C_K1p "K1p, simid1, Krs (hash(K1p, simid1))", in association with the acquired SIM identification information simid1, in the flash memory inside the control unit 140 in the communication unit 3-2.

Conversely, upon being notified by the SIM 100-2 that the verification of the public key certificate C_K1p "K1p, simid1, Krs (hash(K1p, simid1))" has failed, the public key certificate management application discards the public key certificate "K1p, simid1, Krs (hash(K1p, simid1))". Alternatively, a predetermined error procedure may be executed.

[Information Transmission Procedure]

Next, steps S7 to S12 in the public key certificate transmission procedure will explained.

(Step S7)

In the communication device 3-1, the signature generation application computes a digest of the information transmitted to the communication device 3-2. In this case, a hash value is used as an example of the digest. The signature generation application transfers the computed hash value, hash(information), to the SIM 100-1, and generates a signature.

(Step S8)

The encryption processing unit 104 in the SIM 100-1 computes a hash value, hash(hash(information), simid1) of data including the SIM identification information simid1 and the hash value, hash(information), received from the signature generation application. Furthermore, the encryption processing unit 104 encrypts the computed hash value, hash(hash(information), simid1) using the secret key K1s stored in the secret key memory unit 106 in the SIM 100-1. The decrypted data K1s (hash(hash(information), simid1)) is the electronic signature of the information transmitted to the communication device 302. This electronic signature K1s (hash(hash(information, simid1)) is generated in the secure RAM inside the SIM 100-1.

(Step S9)

The SIM 100-1 transfers the electronic signature K1s (hash(hash(information), simid1)) generated by the encryption processing unit 104 to the signature generation application.

(Step S10)

In the communication device 3-1, the signature generation application outputs the electronic signature K1s (hash(hash (information), simid1)) received from the SIM 100-1 to the communication unit 130. The communication unit 130 transmits the electronic signature K1s (hash(hash(information), simid1)), the information transmitted to the communication device 3-2 and the SIM identification information simid1 to the communication device 3-2.

In the communication device 3-2, the communication unit 130 receives, from the communication device 3-1, the electronic signature K1s (hash(hash(information), simid1)), the information and the SIM identification information simid1. The communication unit 130 transfers the electronic signature K1s (hash(hash(information), simid1)), the information and the SIM identification information simid1 that have been received to the signature verification application. (Step S11)

In the communication device 3-2, the signature verification application computes a verification hash value, hash' (information), which is the hash value of the information received from the communication device 3-1. Furthermore, the signature verification application computes a verification hash value, hash'(hash'(information), simid1), which is the hash value of data including the SIM identification information simid1 received from the communication device 3-1, and the verification hash value, hash'(information). (Step S12)

In the communication device 3-2, the signature verification application notifies the public key certificate management application of the SIM identification information simid1 received from the communication device 3-1, and requests a public key certificate. The public key certificate management application transfers, to the signature verification application, the public key certificate C_K1p "K1p, simid1, Krs (hash(K1p, simid1))" that is saved in association with the SIM identification information simid1 obtained from the signature verification application. The signature verification application acquires a public key K1p from the public key certificate C_K1p "K1p, simid1, Krs (hash(K1p, simid1))" received from the public key certificate management application. The signature verification application uses the acquired public key K1p to decrypt the electronic signature K1s (hash(hash(information), simid1)) received from the communication device 3-1. This decryption results in decrypted data "K1p·K1s (hash(hash(information), simid1))". The signature verification application determines whether the verification hash value, hash'(hash'(information), simid1), and the decrypted data "K1p·K1s (hash(hash (information), simid1))" match. If, as a result of this determination, the values match, then the validity of the information received from the communication device 3-1 is successfully verified. Conversely, if the values do not match, then the verification of the validity of the information received from the communication device 3-1 fails. In the case of failure, the information received from the communication device 3-1 is discarded. Alternatively, a predetermined error procedure may be executed. For example, it may be reported that the information received from the communication device 3-1 has been altered, or it may be reported that the transmitter of the information is fake (an impostor or the like).

According to the present embodiment, the communication device 3 functions as a certification authority (CA) and generates a public key certificate. Thus, the supplier of the public key (public key certificate) does not need to go through the hassle of sending the public key to a certification authority, which is a third-party organization, in order to be issued a public key certificate. As a result thereof, the advantageous effect of being able to reduce the hassle of exchanging public keys (public key certificates) can be obtained. Additionally, compared to the case in which conventional PKI is used, the cost and the burden of application procedures and the like can be reduced.

In the present embodiment, the SIM 100 provided in the communication device 3 is a SIM that has been user-authenticated by a network operator. This means that the communication device 3 could serve as a basis for trust as a certification authority.

In the present embodiment, the decryption processing unit 104 in the SIM 100 is an example of a first decryption processing unit. The signature verification application, which is one of the applications 150 in the control unit 140 of the communication device 3, is an example of the public key certificate management. The SIM 100 is an example of a subscriber identification unit.

The person operating the communication device 3 could be bound to (associated with) the communication device 3. For example, it is possible to apply memory authentication in which a predetermined password must be entered for operations and information that require authentication. Specifically, for example, when the communication device 3 generates a public key or a public key certificate, the person operating the communication device 3 may be required to enter a predetermined password. Additionally, when appending an electronic signature using the secret key in the SIM 100 in the communication device 3, the person operating the communication device 3 may be required to enter a predetermined password.

Additionally, the electronic signature may be applied by indicating, in a form in the public key certificate or in an attribute certificate associated with the public key certificate, the operation history (information on the location during operation, application running history and the like), on the condition that the permission of the owner of the communication device 3 is obtained.

Additionally, the electronic signature may be applied by indicating, in a form in the public key certificate or in an attribute certificate associated with the public key certificate, information regarding the owner of the communication device 3 held by the network operator, on the condition that the permission of the owner is obtained.

Additionally, SIM is a generic name for communication modules that store specific identification information associated with user identification information, and is not limited to being a communication module that is used for a specific communication system. For example, a UIM (User identity Module), a USIM (Universal Subscriber Identity Module), an eSIM (Embedded Subscriber Identity Module) or the like may be used.

The communication device 3 transmitting the public key certificate need not have a public key certificate verification function and a public key certificate saving function. Specifically, the communication device 3 transmitting the public key certificate need not have a verification unit 103 and a public key certificate management application.

Additionally, the communication device 3 receiving the public key certificate need not have a public key certificate generation function. Specifically, the communication device 3 receiving the public key certificate need not have a public key certificate generation unit 102 and a secret key memory unit 106.

Additionally, a pair of a public key and a secret key pair may be prestored in a SIM 100. For example, a pair of a public key and a secret key may be stored in the SIM 100 at the time of manufacture of the SIM 100. If a pair of a public key and a secret key is prestored in the SIM 100, then the SIM 100 need not have a key generation unit 101.

Additionally, multiple pairs of public keys (public key certificates) and secret keys may be generated or saved. In this case, for example, the communication device 3 may use a different pair of a public key (public key certificates) and a secret key depending on the communication partner. Additionally, if a certain pair of a public key (public key certificate) and a secret key is leaked, then the communication device 3 may switch to a different pair.

User identification information associated with SIM identification information may be included, in the public key certificate. When user identification information is included in the public key certificate, the SIM identification information need not be included in the public key certificate. Additionally, when user identification information is included in the public key certificate, the public key certificate management unit may store the public key certificate in association with the user identification information.

Additionally, the user identification information associated with the SIM identification information may be included in the electronic signature of the transmitted information. In this case, when transmitting the information, the user identification information and the electronic signature are transmitted together therewith.

Second Embodiment

Figure 3:
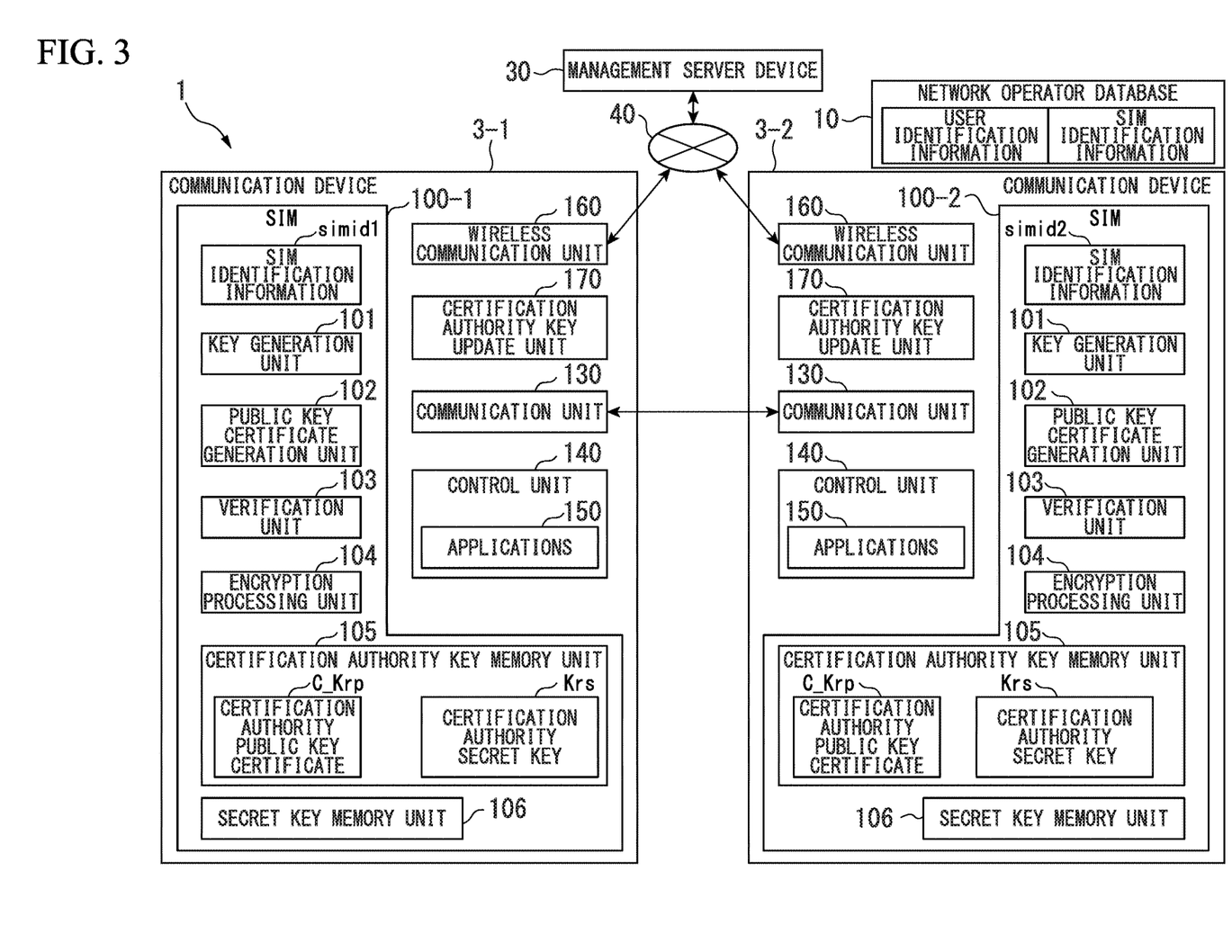
FIG. 3 is a schematic diagram showing a communication system according to a second embodiment.

The second embodiment is a modification of the above-described first embodiment. FIG. 3 is a schematic diagram showing a communication system 1 according to the second embodiment. In FIG. 3, the parts that correspond to parts in FIG. 1 are denoted by the same reference signs and the explanations thereof will be omitted. The communication device 3 according to the second embodiment shown in FIG. 3 includes a wireless communication unit 160 and a certification authority key update unit 170 in addition to the communication device 3 of the above: described first embodiment shown in FIG. 1. Hereinbelow, the second embodiment will be explained with a focus on the differences from the above-described first embodiment.

In the communication device 3, the wireless communication unit 160 performs communication via a wireless communication network 40 with which it connects by using the SIM 100. The SIM 100 stores information allowing the wireless communication network 40 to be used. The wireless communication unit 160 can make use of the wireless communication network 40 by using the SIM 100. The wireless communication unit 160 connects to the wireless communication network 40 by means of a wireless communication channel that is established by using the SIM 100.

The certification authority key update unit 170 receives, from a management server device 30, via the wireless communication network 40, a new pair of a certification authority public key certificate and a certification authority secret key, which is shared with a SIM 100 of another communication device 3. The management server device 30 manages the pair of a certification authority public key certificate and a certification authority secret key. The management server device 30 transmits, to multiple communication devices 3, via the wireless communication network 40, a new pair of a certification authority public key certificate and a certification authority secret key, which is shared between the SIMs 100 of multiple communication devices 3. The certification authority key update unit 170 transfers, to the SIM 100, the pair of a certification authority public key certificate and a certification authority secret key that has been received, via the wireless communication network 40, from the management server device 30, and instructs the SIM 100 to update the pair of a certification authority public key certificate and a certification authority secret key. The SIM 100 stores the pair of a certification authority public key certificate and a certification authority secret key received from the certification authority key update unit 170 in the certification authority key memory unit 105 as the latest pair of a certification authority public key certificate and a certification authority secret key.

As a result thereof, the pair of a certification authority public key certificate and a certification authority secret key that is shared by the SIMs 100 of multiple communication devices 3 is updated to a new pair of a certification authority public key certificate and a certification authority secret key.

According to the present embodiment, if, for some reason, the pair of a certification authority public key certificate and a certification authority secret key held in the SIM 100 is updated to a new pair, then the new pair of a certification authority public key certificate and a certification authority secret key can be supplied to the SIMs 100 by means of wireless communication. Thus, there is no hassle such as the need to exchange the SIM 100 or the like in order to update a pair of a certification authority public key certificate and a certification authority secret key with a new pair. As a result thereof, it is possible to obtain the advantageous effect of being able to reduce the burden when updating the pair of a certification authority public key certificate and a certification authority secret key to a new pair.

Third Embodiment

Figure 4:
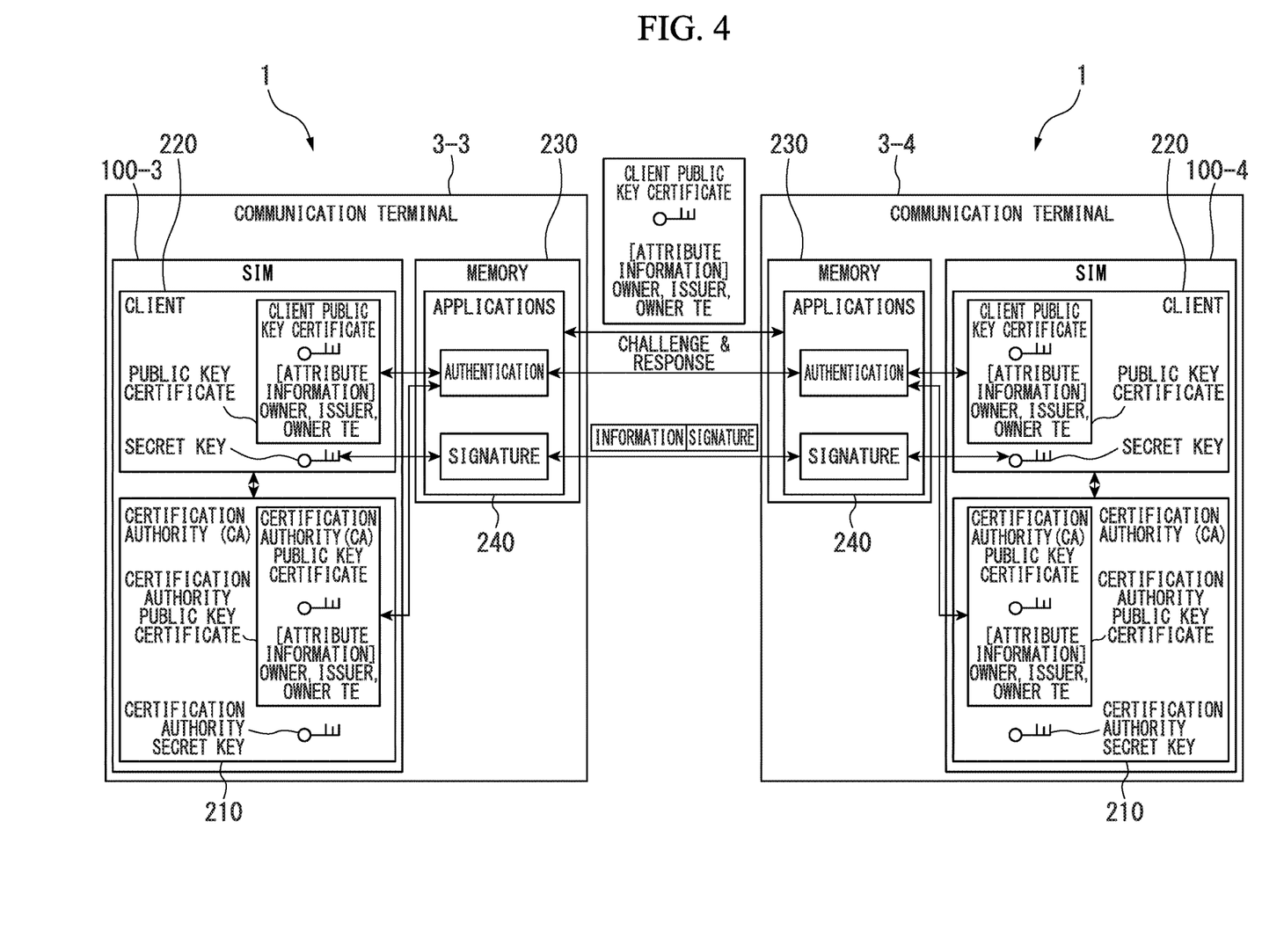
FIG. 4 is a schematic diagram showing a communication system according to a third embodiment.

The third embodiment is an example of an application of the above-described first embodiment or second embodiment. FIG. 4 is a schematic diagram showing communication system 1 according to the third embodiment. The communication system 1 shown in FIG. 4 includes a communication terminal 3-3 and a communication terminal 3-4. The communication terminal 3-3 and the communication terminal 3-4 have configurations similar to those of the communication device 3 in the above-described first embodiment or the second embodiment. The communication terminal 3-3 and the communication terminal 3-4 may, for example, be a portable communication terminal device such as a smartphone or a tablet-type computer (tablet PC) or the like, or a stationary communication terminal device (e.g., a desktop personal computer, server computer, home gateway or the like).

The communication terminal 3-3 includes a SIM 100-3. The communication terminal 3-4 includes a SIM 100-4. The SIM 100-3 and the SIM 100-4 have configurations similar to those of the SIM 100 in the above-described first embodiment or the second embodiment. Thus, the SIM 100-3 and the SIM 100-4 include certification authorities (CA) 210 as functional units thereof. Thus, the communication terminal 3-3 and the communication terminal 3-4 function as certification authorities (CAs). The certification authority 210 of the SIM 100-3 and the certification authority 210 of the SIM 100-4 have the same pair of a certification authority public key certificate and a certification authority secret key.

The SIM 100-3 and the SIM 100-4 have clients 220 as functional units thereof. In the SIM 100-3, the client 220 transfers its own public key to the certification authority 210 and has it generate a public key certificate (client public key certificate) for said public key. Similarly, in the SIM 100-4, the client 220 transfers its own public key to the certification authority 210 and has it generate a public key certificate (client public key certificate) for said public key.

The communication terminal 3-3 and the communication terminal 3-4 have applications 240. The processing for these applications 240 is performed in a memory 230 in a local communication terminal. The applications 240 perform an authentication process and a signature process.

As shown in FIG. 4, in the communication system 1 according to the third embodiment, the communication terminal 3-3 and the communication terminal 3-4 transmit their own client public key certificates to communication partners. The communication terminal 3-3 and the communication terminal 3-4 each verify the validity of the received client public key certificate by means of its own certification authority 210. The communication terminal 3-3 and the communication terminal 3-4 use the client public key certificate of the communication partner after confirming the validity thereof by means of its own certification authority 210. The client public key certificate is used for two-way authentication between the communication terminals and in electronic signatures on information exchanged between the communication terminals. Two-way authentication methods include, for example, challenge/response authentication methods.

Next, examples of the third embodiment will be explained.

Example 1

Figure 5:
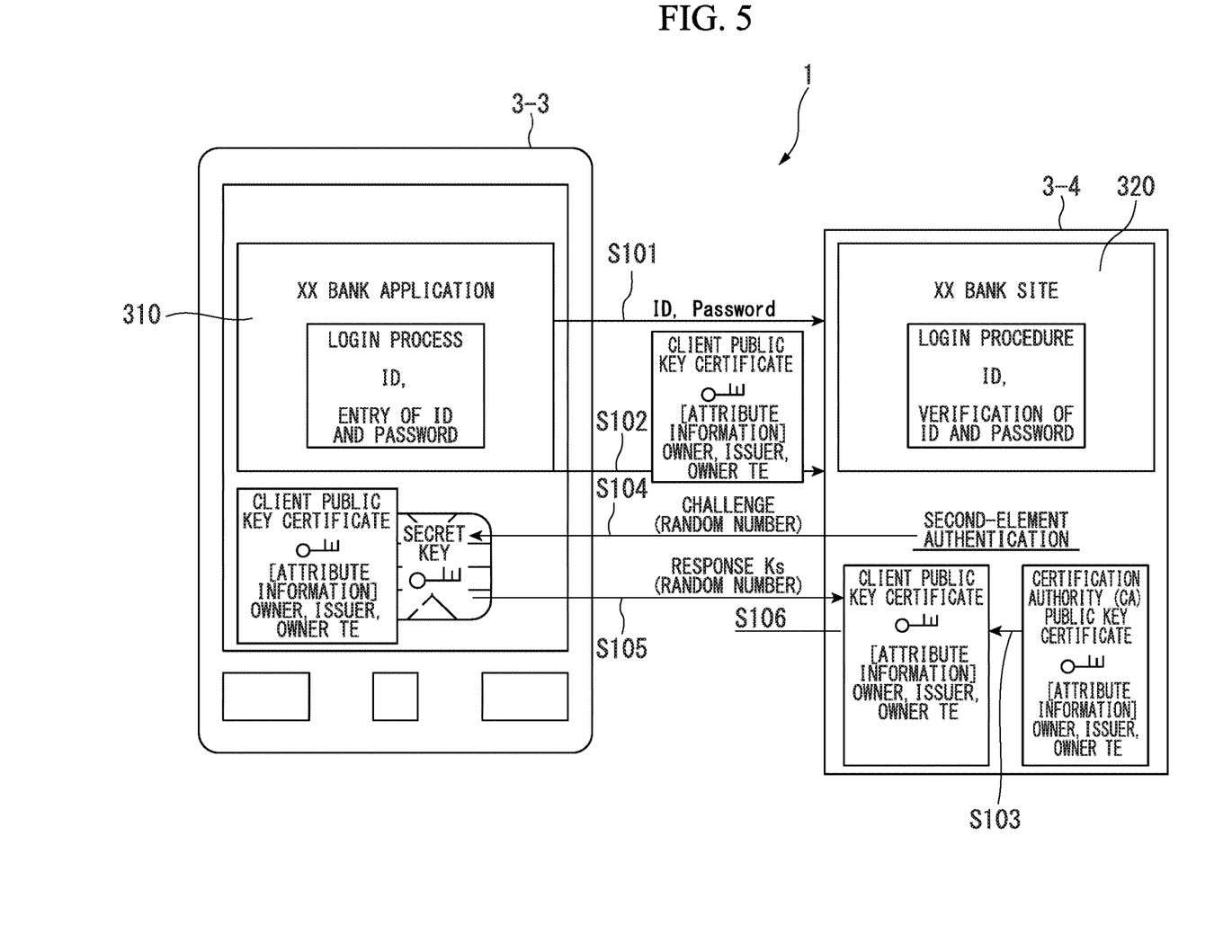
FIG. 5 is an explanatory diagram showing a communication system according to Example 1 of the third embodiment.

Example 1 of the third embodiment will be explained with reference to FIG. 5. FIG. 5 is an explanatory diagram showing a communication system 1 according to Example 1 of the third embodiment. The communication system 1 shown in FIG. 5 is applied to an online banking service system. In FIG. 5, the communication terminal 3-3 includes an online banking service system application 310. The communication terminal 3-4 includes a service site 320 for the online banking service system. Herebelow, the communication method according to the communication system 1 shown in FIG. 5 will be explained.

(Step S101)

In the communication terminal 3-3, the application 310 performs a user ID (identification information) and password input process as a process for logging into the service site 320. The application 310 transmits the ID and password inputted by the user to the service site 320 in the communication terminal 3-4. In the communication terminal 3-4, the service site 320 performs the login process by verifying the validity of the ID and password received from the application 310 in the communication terminal 3-3. If the verification succeeds, then the procedure advances to subsequent processes. However, if the verification of the ID and the password fails, then the procedure is terminated. It is also possible to execute a predetermined error procedure when the verification of the ID and password fails.

(Step S102)

In the communication terminal 3-3, the application 310 transmits the client public key certificate the local communication terminal to the service site 320 of the communication terminal 3-4.

(Step S103: Verification)

In the communication terminal 3-4, the service site 320 verifies the validity of the client public key certificate received from the application 310 of the communication terminal 3-3 by means of the certification authority 210 in the local communication terminal. If this verification succeeds, then the procedure advances to subsequent processes. However, if the verification of the client public key certificate fails, then the procedure is terminated.

It is also possible to execute a predetermined error procedure when the verification of the ID and password fails.

(Step S104)

In the communication terminal 3-4, the service site 320 generates a random number and uses the generated random number as a challenge value. The service site 320 transmits the challenge value (random number) to the application 310 in the communication terminal 3-3.

(Step S105)

In the communication terminal 3-3, the application 310 encrypts the challenge value (random number) received from the service site 320 in the communication terminal 3-4 using the secret key Ks that is paired with the client public key certificate of the local communication terminal. The encryption of the challenge value (random number) is performed in a secure RAM inside the SIM 100-3 in the communication terminal 3-3. The application 310 transmits encrypted data Ks (random number), which is the result of encryption of the challenge value (random number), to the service site 320 of the communication terminal 3-4, as a response value.

(Step S106: Verification)

In the communication terminal 3-4, the service site 320 verifies the validity of the response value Ks (random number) received from the application 310 in the communication terminal 3-3 by using the public key of the client public key certificate of the communication terminal 3-3. For example, if the result decryption of the response value Ks (random number) with the public key matches the challenge value (random number), then the verification is considered to be successful, whereas if it does not match the challenge value (random number), then the verification is considered to have failed. If the response value Ks (random number) is successfully verified, then the login to the service site 320 is considered to have succeeded. Conversely, if the verification of the response value Ks (random number) fails, then the login to the service site 320 is considered to have failed. It is also possible to execute a predetermined error procedure when the verification of the response value Ks (random number) fails.

According to the present Example 1, during user authentication, it is possible to further perform challenge/response authentication in addition to ID/password authentication. As a result thereof, user authentication can be performed by means of two authentication elements, i.e., ID/password authentication and challenge/response authentication, so the reliability of user authentication is improved. For this reason, while the reliability of ID/password authentication has been conventionally raised by using random number tables for updating passwords or by using tools such as time-synchronized one-time password generation applications, according to the present Example 1, the operation can be completed without using such tools.

Additionally, the service site 320 saves the client public key certificate of the communication terminal 3-3, so that if the user becomes unable to use the client public key certificate of the communication terminal 3-3 clue to loss of the communication terminal 3-3, the user authentication of the user will fail during the challenge/response authentication. This functions as a remote lock against logging into the service site 320 by means of the user ID when the communication terminal 3-3 is lost.

Example 2

Figure 6:
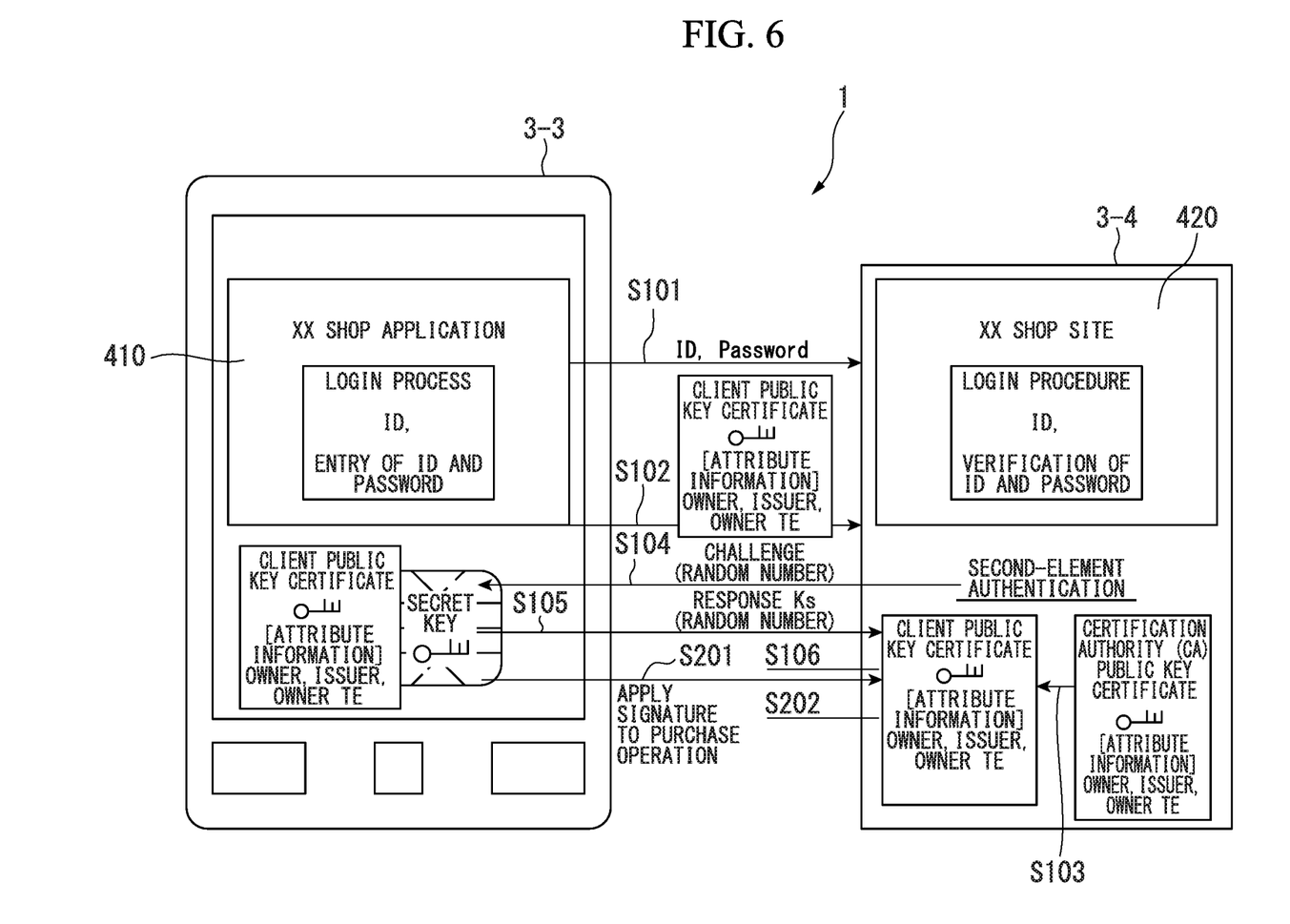
FIG. 6 is an explanatory diagram showing a communication system according to Example 2 of the third embodiment.

Example 2 of the third embodiment will be explained with reference to FIG. 6. FIG. 6 is an explanatory diagram showing a communication system 1 according to Example 2 of the third embodiment. The communication system 1 shown in FIG. 6 is applied to an online shopping service system. In FIG. 6, the communication terminal 3-3 includes an online shopping service system application 410. The communication terminal 3-4 includes a service site 420 for the online shopping service system.

Herebelow, the communication method according to the communication system 1 shown in FIG. 6 will be explained. In FIG. 6, the parts that correspond to steps in FIG. 5 are denoted by the same reference signs and the explanations thereof will be omitted.

In FIG. 6, as a result of execution of the procedure from steps S101 to S106, the user has been successfully authenticated, and the user has successfully logged into the service site 420 with the user ID. Subsequently, the user performs online shopping purchase operations using said ID at the service site 420.

(Step S201)

In the communication terminal 3-3, the application 410 uses the secret key Ks paired with the public key of the client public key certificate of the local communication terminal to generate an electronic signature of purchase operation info nation indicating a purchase operation performed by the user. This electronic signature is generated in the secure RAM inside the SIM 100-3 in the communication terminal 3-3. The application 410 transmits the purchase operation information and the electronic signature of the purchase operation information to the service site 320 of the communication terminal 3-4.

(Step S202: Verification)

In the communication terminal 3-4, the service site 420 verifies the validity of the electronic signature of the purchase operation information received from the application 410 in the communication terminal 3-3 by using the public key of the client public key certificate in the communication terminal 3-3. The verification of the electronic signature of the purchase operation information succeeds, then the service site 420 accepts the purchase operation indicated by the purchase operation information received from the application 410 in the communication terminal 3-3. As a result thereof, the purchase operation performed by the user is executed at the service site 420. Conversely, if the verification of the electronic signature of the purchase operation information fails, then the service site 420 does not accept the purchase operation indicated by the purchase operation information received from the application 410 in the communication terminal 3-3. As a result thereof, the purchase operation performed by the user is not executed at the service site 420. It is also possible to execute a predetermined error procedure when the verification of the electronic signature of the purchase operation information fails.

According to present Example 2, as with the above-described Example 1, user authentication can be performed by means of two authentication elements, i.e., ID/password authentication and challenge/response authentication, so the reliability of user authentication is improved.

Additionally, according to present Example 2, when accepting a purchase operation, the validity of the purchase operation can be confirmed by verifying the validity of the electronic signature of the purchase operation information. Due thereto, while personal confirmation by telephone was conventionally performed in order to confirm the validity of a purchase operation, according to present Example 2, the operation can be completed without performing personal confirmation by telephone.

While embodiments of the present invention have been described in detail above by referring to the drawings, the specific structure is not limited to these embodiments, and design modifications and the like within a range not departing from the gist of the present invention are included.

A computer program for carrying out the functions of the communication devices or communication terminals according to the above-described embodiments may be recorded onto a computer-readable recording medium, and the program recorded on this recording medium may be read into a computer system and executed. The "computer system" as used herein may include an OS and hardware such as peripheral devices.

Additionally, the "computer-readable recording medium" refers to portable media such as flexible disks, magneto-optic discs, ROMs (Read-Only Memory), writable non-volatile memory devices such as flash memories, and DVDs (Digital Versatile Discs), or memory devices such as hard disks that are internal to the computer system.

Furthermore, the "computer-readable recording medium" also includes media that only hold the program for a certain period of time, such as volatile memory devices (e.g., DRAM (Dynamic Random Access Memory)) inside computer systems that serve as servers or clients when the program is being transmitted over a network such as the internet or over communication lines such as telephone lines.

Additionally, the above-mentioned program may be transmitted from a computer system that stores the program in a memory device or the like, to another computer system, via a transmission medium or by transmission waves in a transmission medium. In this case, the "transmission medium" that transmits the program refers to media having the function of transmitting information, including networks (communication networks) such as the Internet or communication lines (communication cables) such as telephone lines.

Additionally, the above-mentioned program may be for implementing just some of the aforementioned functions.

Furthermore, the above-mentioned program may be implemented by combining the aforementioned functions with a program that is already recorded in the computer system, such as a so-called difference file (difference program).

INDUSTRIAL APPLICABILITY

The present invention may be applied to a communication device, a communication and a computer program.

REFERENCE SYMBOLS

1 Communication system
3-1, 3-2 Communication terminal
10 Network operator database
30 Management server device
40 Wireless communication network
100-1 to -4 SIM
101 Key generation unit
102 Public key certificate generation unit
103 Verification unit
104 Encryption processing unit
105 Certification authority memory unit
106 Secret key memory unit
130 Communication unit
140 Control unit
160 Wireless communication unit 170 Certification authority key update unit
210 Certification authority

The invention claimed is:
1. A communication apparatus comprising:
a first subscriber identity module that stores first subscriber identity module identification information associated with first user identification information; and
a wired or wireless communication device that communicates with another communication apparatus, the other communication apparatus comprising a second subscriber identity module that stores second subscriber identity module identification information associated with second user identification information,
wherein the first subscriber identity module comprises:
a certification authority key memory that records a pair of a certification authority public key certificate and a certification authority secret key, the pair being shared with the second subscriber identity module;
a memory storing instructions; and
a processor configured to execute the instructions to generate a first public key certificate comprising
a first public key;
the first subscriber identity module identification information or the first user identification information; and
an electric key signature of the first public key, the electric key signature being encrypted data resulting from an encryption, with the certification authority secret key, of data including the first public key and the first subscriber identity module identification information or the first user identification information, and
wherein the wired or wireless communication device transmits, to the other communication apparatus, the first public key certificate.

2. The communication apparatus according to claim 1,
wherein the first subscriber identity module further comprises a secret key memory that records a secret key paired with the first public key certificate, and
wherein the processor is further configured to execute the instructions to perform an encryption, by public key cryptography, of information using the secret key recorded in the secret key memory, the information comprising the first subscriber identity module identification information or the first user identification information.

3. A communication apparatus comprising:
a first subscriber identity module that stores first subscriber identity module identification information associated with first user identification information; and
a wired or wireless communication device that communicates with another communication apparatus, the other communication apparatus comprising a second subscriber identity module that stores second subscriber identity module identification information associated with second user identification information,
wherein the first subscriber identity module comprises:
a certification authority key memory that records a pair of a certification authority public key certificate and a certification authority secret key, the pair being shared with the second subscriber identity module;
a memory storing instructions; and
a processor configured to execute the instructions to generate a first public key certificate comprising
a first public key;
the first subscriber identity module identification information or the first user identification information; and
a first electric key signature of the first public key, the first electric key signature being encrypted data resulting from an encryption, with the certification authority secret key, of data including the first public key and the first subscriber identity module identification information or the first user identification information,
wherein the processor is further configured to execute the instructions to verify, using the certification authority public key certificate, a second public key certificate that the communication apparatus has received from the other communication apparatus, the second public key certificate comprising
a second public key;
the second subscriber identity module identification information or the second user identification information; and
a second electric key signature of the second public key, the second electric key signature being encrypted data resulting from an encryption, with the certification authority secret key, of data including the second public key and the second subscriber identity module identification information or the second user identification information, and
wherein the wired or wireless communication device transmits, to the other communication apparatus, the first public key certificate.

4. The communication apparatus according to claim 3,
wherein the first subscriber identity module further comprises a secret key memory that records a secret key paired with the first public key certificate,
wherein the processor is further configured to execute the instructions to perform an encryption, by public key cryptography, of information using the secret key recorded in the secret key memory, the information comprising the first subscriber identity module identification information or the first user identification information, and
wherein the processor is further configured to execute the instructions to perform, using the second public key of the second public key certificate whose validity has been verified, an encryption, by public key cryptography, of information comprising the second subscriber identity module identification information or the second user identification information.

5. A communication apparatus comprising:
a first subscriber identity module that stores first subscriber identity module identification information associated with first user identification information; and
a wired or wireless communication device that communicates with another communication apparatus, the other communication apparatus comprising a second subscriber identity module that stores second subscriber identity module identification information associated with second user identification information,
wherein the first subscriber identity module comprises:
a certification authority key memory that records a pair of a certification authority public key certificate and a certification authority secret key, the pair being shared with the second subscriber identity module;
a memory storing instructions; and
a processor configured to execute the instructions to verify, using the certification authority public key certificate a second public key certificate that the wired or wireless communication device has received from the other communication apparatus, the second public key certificate comprising a second public key;

the second subscriber identity module identification information or the second user identification information; and a second electric key signature of the second public key, the second electric key signature being encrypted data resulting from an encryption, with the certification authority secret key, of data including the second public key and the second subscriber identity module identification information or the second user identification information.

6. The communication apparatus according to claim 5, wherein the processor is further configured to execute the instructions to perform, using the second public key of the second public key certificate whose validity has been verified, an encryption, by public key cryptography, of information comprising the second subscriber identity module identification information or the second user identification information.

7. The communication apparatus according to claim 1, further comprising:

a wireless communication device that performs communication via a wireless communication network that is connected using the first subscriber identity module, wherein the wireless communication device receives, via the wireless communication network, a new pair of a public key certificate and a secret key, the new pair being shared with the second subscriber identity module.

8. A communication method for a communication apparatus, the communication apparatus including i) a first subscriber identity module that stores first subscriber identity module identification information associated with first user identification information, and ii) a wired or wireless a communication device that communicates with another communication apparatus, the other communication apparatus comprising a second subscriber identity module that stores second subscriber identity module identification information associated with second user identification information, the method comprising:

recording, by the first subscriber identity module, a pair of
a certification authority public key certificate and a certification authority secret key, the pair being shared with the second subscriber identity module;

generating, by the first subscriber identity module, a first public key certificate comprising a first public key;

the first subscriber identity module identification information or the first user identification information; and a first electric key signature of the first public key, the first electric key signature being encrypted data resulting from an encryption, with the certification authority secret key, of data including the first public key and the first subscriber identity module identification information or the first user identification information;

transmitting, by the wired or wireless communication device, the first public key certificate to the other communication apparatus; and verifying, by the first subscriber identity module, using the certification authority public key certificate, a second public key certificate that the wired or wireless communication device has received from the other communication apparatus, the second public key certificate comprising a second public key;

recording a pair of a certification authority public key certificate and a certification authority secret key, the pair being shared with the second subscriber identity module;

generating a first public key certificate comprising a first public key;

the first subscriber identity module identification information or the first user identification information; and a first electric key signature of the first public key, the first electric key signature being encrypted data resulting from an encryption, with the certification authority secret key, of data including the first public key and the first subscriber identity module identification information or the first user identification information; and verifying, using the certification authority public key certificate, a second public key certificate that has been received from the other communication apparatus, the second public key certificate comprising a second public key;

the second subscriber identity module identification information or the second user identification information; and a second electric key signature of the second public key, the second electric key signature being encrypted data resulting from an encryption, with the certification authority secret key, of data including the second public key and the second subscriber identity module identification information or the second user identification information.

9. A non-transitory computer-readable recording medium storing a computer program that causes a computer of a communication apparatus comprising a first subscriber identity module that stores first subscriber identity module identification information associated with first user identification information, to execute:

communicating with another communication apparatus, the other communication apparatus comprising a second subscriber identity module that stores second subscriber identity module identification information associated with second user identification information;

the second subscriber identity module identification information or the second user identification information; and a second electric key signature of the second public key, the second electric key signature being encrypted data resulting from an encryption, with the certification authority secret key, of data including the second public key and the second subscriber identity module identification information or the second user identification information, wherein the communicating comprises transmitting the first public key certificate to the other communication apparatus.

* * * * *

UNITED STATES PATENT AND TRADEMARK OFFICE
CERTIFICATE OF CORRECTION

PATENT NO. : 10,671,717 B2
APPLICATION NO. : 15/769231
DATED : June 2, 2020
INVENTOR(S) : Keisuke Takemori et al.

It is certified that error appears in the above-identified patent and that said Letters Patent is hereby corrected as shown below:

In the Claims

At Column 22, Line 6 through Line 36, Claim 8: please delete in their entirely, and replace with the following:
--the second subscriber identity module identification information or the second user identification information; and
a second electric key signature of the second public key, the second electric key signature being encrypted data resulting from an encryption, with the certification authority secret key, of data including the second public key and the second subscriber identity module identification information or the second user identification information.--

At Column 22, Line 48 through Line 60, Claim 9: please delete in their entirely, and replace with the following:
--recording a pair of a certification authority public key certificate and a certification authority secret key, the pair being shared with the second subscriber identity module;
generating a first public key certificate comprising
a first public key;
the first subscriber identity module identification information or the first user identification information; and
a first electric key signature of the first public key, the first electric key signature being encrypted data resulting from an encryption, with the certification authority secret key, of data including the first public key and the first subscriber identity module identification information or the first user identification information; and
verifying, using the certification authority public key certificate, a second public key certificate that has been received from the other communication apparatus, the second public key certificate comprising
a second public key;
the second subscriber identity module identification information or the second user identification information; and
a second electric key signature of the second public key, the second electric key Signed and Sealed this
Fifteenth Day of December, 2020

Andrei Iancu
*Director of the United States Patent and Trademark Office* signature being encrypted data resulting from an encryption, with the certification authority secret key, of data including the second public key and the second subscriber identity module identification information or the second user identification information, wherein the communicating comprises transmitting the first public key certificate to the other communication apparatus.--